United States Patent [19]

Sasaki et al.

[11] Patent Number: 4,772,911
[45] Date of Patent: Sep. 20, 1988

[54] IMAGE FORMATION APPARATUS

[75] Inventors: Takashi Sasaki, Tokyo; Nobuaki Sakurada, Yokohama; Hideaki Kawamura, Tokyo, all of Japan

[73] Assignee: Canon Kabushiki Kaisha, Tokyo, Japan

[21] Appl. No.: 62,416

[22] Filed: Jun. 16, 1987

Related U.S. Application Data

[63] Continuation of Ser. No. 690,644, Jan. 11, 1985, abandoned.

[30] Foreign Application Priority Data

Jan. 19, 1984 [JP] Japan .................. 59-8344

[51] Int. Cl.$^4$ .................. G01D 15/18; H04N 1/26
[52] U.S. Cl. .................. 346/140 R; 346/46; 346/75; 346/76 PH; 358/75; 358/296; 358/298
[58] Field of Search .................. 346/140 R, 46, 76 PH, 346/75; 358/296, 298, 75

[56] References Cited

U.S. PATENT DOCUMENTS

| Re. 27,555 | 1/1973 | Loughren | 358/78 |
|---|---|---|---|
| 1,656,338 | 1/1928 | Ranger | 358/298 |
| 1,790,723 | 2/1931 | Ranger | 428/195 |
| 1,817,098 | 8/1931 | Ranger | 358/75 |
| 3,197,558 | 7/1965 | Ernst | 358/283 |
| 3,681,650 | 8/1972 | Koll | 315/30 |
| 3,683,212 | 8/1972 | Zoltan | 310/8.3 |
| 3,739,084 | 6/1973 | Heinrich | 178/6 |
| 3,747,120 | 7/1973 | Steeme | 346/75 |
| 3,864,696 | 2/1975 | Fischbeck | 346/140 |
| 3,961,306 | 6/1976 | Anstey | 340/15.5 |
| 3,977,007 | 8/1976 | Berry et al. | 346/1 |
| 4,050,077 | 9/1977 | Yamada et al. | 346/75 |
| 4,108,654 | 8/1978 | Goren | 96/1.2 |
| 4,178,597 | 12/1979 | Isayama et al. | 346/75 |
| 4,272,771 | 6/1981 | Furukawa | 346/75 |
| 4,300,142 | 11/1981 | Kos | 346/76 PH |
| 4,313,684 | 2/1982 | Tazani et al. | 400/322 X |
| 4,314,274 | 2/1982 | Atoji et al. | 358/80 |
| 4,339,774 | 7/1982 | Temple | 358/283 |
| 4,342,051 | 7/1982 | Suzuki et al. | 358/283 |
| 4,353,079 | 10/1982 | Kawanabe | 346/140 R |
| 4,365,275 | 12/1982 | Berman et al. | 358/283 |
| 4,368,491 | 1/1983 | Saito | 358/283 |
| 4,386,272 | 5/1983 | Check, Jr. et al. | 250/236 |
| 4,389,712 | 6/1983 | Frattarola et al. | 365/127 |
| 4,394,662 | 7/1983 | Yoshida et al. | 346/33 |
| 4,394,693 | 7/1983 | Shirley | 358/298 |
| 4,403,874 | 9/1983 | Payne et al. | 400/124 |
| 4,412,225 | 10/1983 | Yoshida | 346/1.1 |
| 4,412,226 | 10/1983 | Yoshida | 346/1.1 |
| 4,413,275 | 11/1983 | Horiuchi et al. | 358/75 |
| 4,414,635 | 11/1985 | Gast et al. | 364/526 |
| 4,438,453 | 3/1984 | Alston | 358/78 |
| 4,446,470 | 5/1984 | Sugiyama et al. | 346/140 |
| 4,468,706 | 8/1984 | Cahill | 358/300 |
| 4,488,245 | 12/1984 | Dalke et al. | 364/526 |
| 4,494,128 | 1/1985 | Vaught | 346/140 R |
| 4,499,479 | 2/1985 | Lee et al. | 346/140 R |
| 4,533,920 | 8/1985 | Suzuki | 346/1.1 |
| 4,533,923 | 8/1985 | Suzuki | 346/1.1 |
| 4,533,928 | 8/1985 | Sugiura et al. | 346/140 R |
| 4,547,812 | 10/1985 | Waller et al. | 358/283 |
| 4,549,222 | 10/1985 | Fogaroli et al. | 358/296 |
| 4,560,997 | 12/1985 | Sato et al. | 346/140 R |
| 4,604,654 | 8/1986 | Sakurada et al. | 358/298 |

FOREIGN PATENT DOCUMENTS

| 11712 | 3/1977 | Japan . |
| 102034 | 3/1978 | Japan . |
| 156264 | 4/1982 | Japan . |
| 60878 | 2/1983 | Japan . |
| 41969 | 2/1984 | Japan . |
| 52658 | 2/1984 | Japan . |

Primary Examiner—E. A. Goldberg
Assistant Examiner—Gerald E. Preston
Attorney, Agent, or Firm—Fitzpatrick, Cella, Harper & Scinto

[57] ABSTRACT

An image formation apparatus such as an ink-jet color printer has a head selection controller, a dither processor, and a selection switch for selecting the head selection controller or the dither processor. Dither processing or analog processing can be selected to reproduce any type of image with excellent quality.

14 Claims, 3 Drawing Sheets

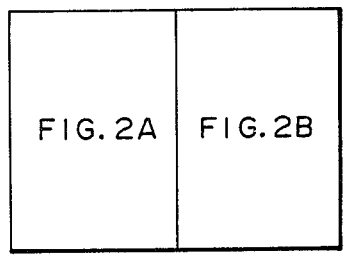
F I G. 2
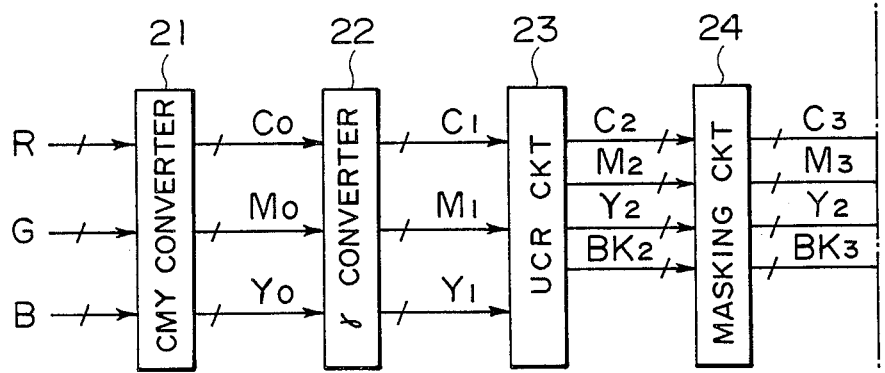
F I G. 2A
| 0 | 8 | 2 | 10 |
| --- | --- | --- | --- |
| 12 | 4 | 14 | 6 |
| 3 | 11 | 1 | 9 |
| 15 | 7 | 13 | 5 |
F I G. 3

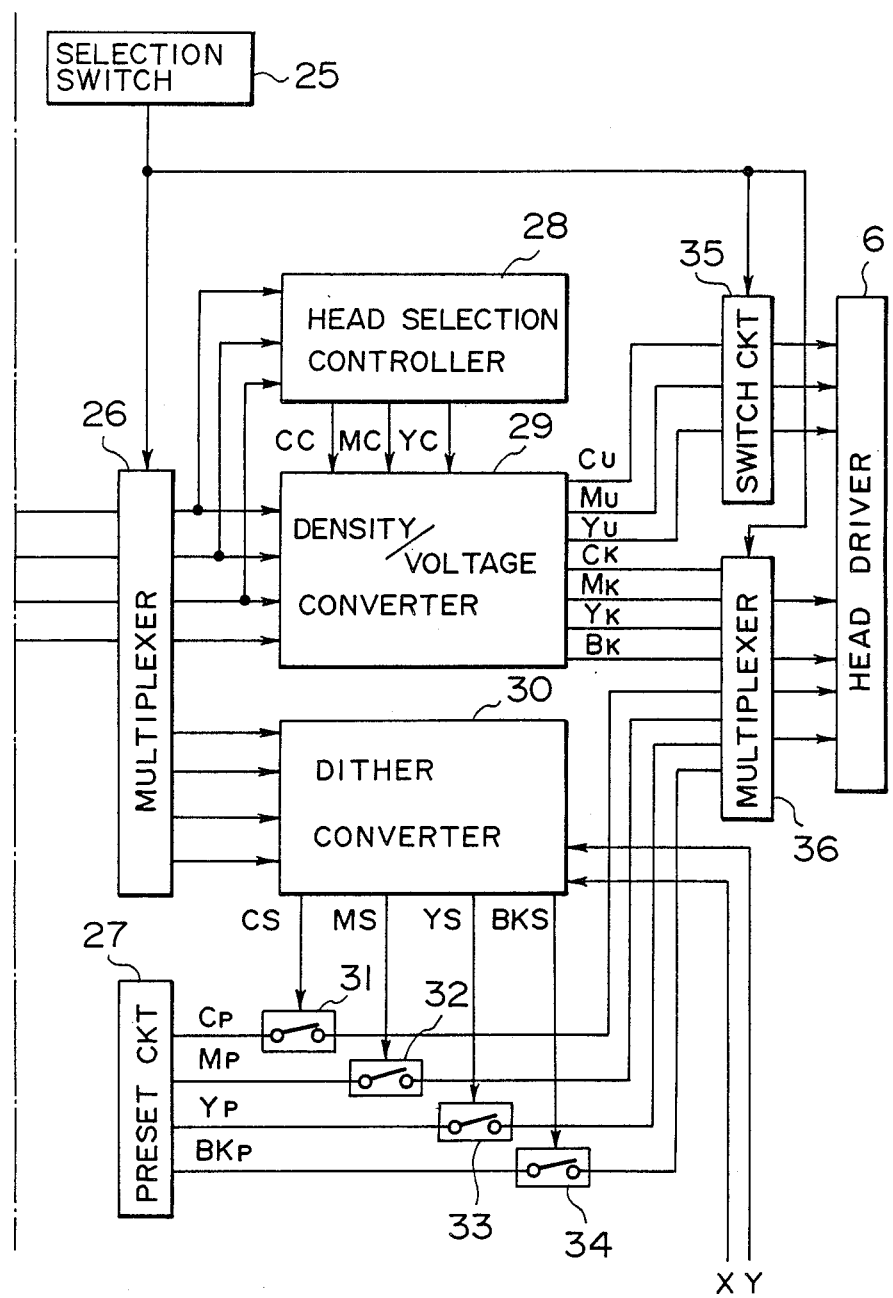
F I G. 2B

IMAGE FORMATION APPARATUS

This application is a continuaton of application Ser. No. 690,644 filed Jan. 11, 1985, now abandoned.

BACKGROUND OF THE INVENTION

1. Field of the Invention

The present invention relates to an image formation apparatus for forming a color dot image in response to an input image signal.

2. Description of the Prior Art

In an apparatus of the type described above, when a color image is formed, three R, G and B input color signals supplied in units of pixels are subjected to image processing to form three Y, M and C output color signals. The dot density per unit area of an image or the dot size is controlled in accordance with the level of each output color signal to form a color image including a halftone portion.

One technique of controlling the dot density per unit area of an image is generally referred to as density modulation. The density modulation technique includes a density pattern method and a dither method. According to the density pattern method, a unit block of an output image is divided into a predetermined number of cells, and the number of ON (colored) or OFF (non-colored) cells is varied in accordance with the density of each pixel of the original image. In the dither method, the density of each pixel of the original image is compared with a threshold value determined under prescribed conditions, and the ON/OFF state of each output dot is controlled according to the comparison result. A plurality of threshold levels are used or the input pixel is level-shifted to provide a gray level or a half tone. In the density modulation method, the dot size remains the same. However, when the number of cells within a single pixel is increased in order to obtain a certain gray level range, one pixel becomes large and resolution is lowered.

In contrast, in an analog technique, in which the dot size is changed, a single dot can express a gray level and resolution can be improved. On the other hand, since the modulating width of the dot size is limited, the gray level range is limited. In view of this problem, a method has recently been proposed in which dots having a plurality of inherent densities are used (for example, by using inks of different dye concentrations) for one color. This method is described in, for example, U.S. patent application Ser. No. 491,654 filed on May 5, 1983.

This analog method of utilizing dots of different densities provides an excellent halftone effect and resolution and allows excellent reproduction of relatively bright colors such as skin color. The method is therefore very effective in the field of pictorial printing such as portraits and scenic views. However, in the case of artificial images such as computer graphics, figures or graphs wherein predetermined areas are printed in the same color, when readout values are obtained for an image portion within a single area due to shading or noise effect, an area printed with dark dots and an area printed with bright dots may be present at the same time, thereby forming a pseudo edge line at the boundary between the two areas, which results in poor printing.

SUMMARY OF THE INVENTION

It is an object of the present invention to provide an image formation apparatus which can switch between image formation by density modulation and analog image formation in accordance with an input image signal.

It is another object of the present invention to provide an image formation apparatus which has a recording means having a plurality of inherent densities for at least one of a plurality of color dots, and which can switch between image formation using all the color dots and image formation using dots with different inherent densities in accordance with an input image signal.

The above and other objects, features and advantages of the present invention will become apparent from the following description taken in conjunction with the accompanying drawings.

BRIEF DESCRIPTION OF THE DRAWINGS

FIG. 2 (composite FIGS. 2A and 2B) is a detailed block diagram of an image processing circuit in FIG. 1; and FIG. 3 shows an example of a threshold matrix.

DETAILED DESCRIPTION OF THE PREFERRED EMBODIMENT

Figure 1:
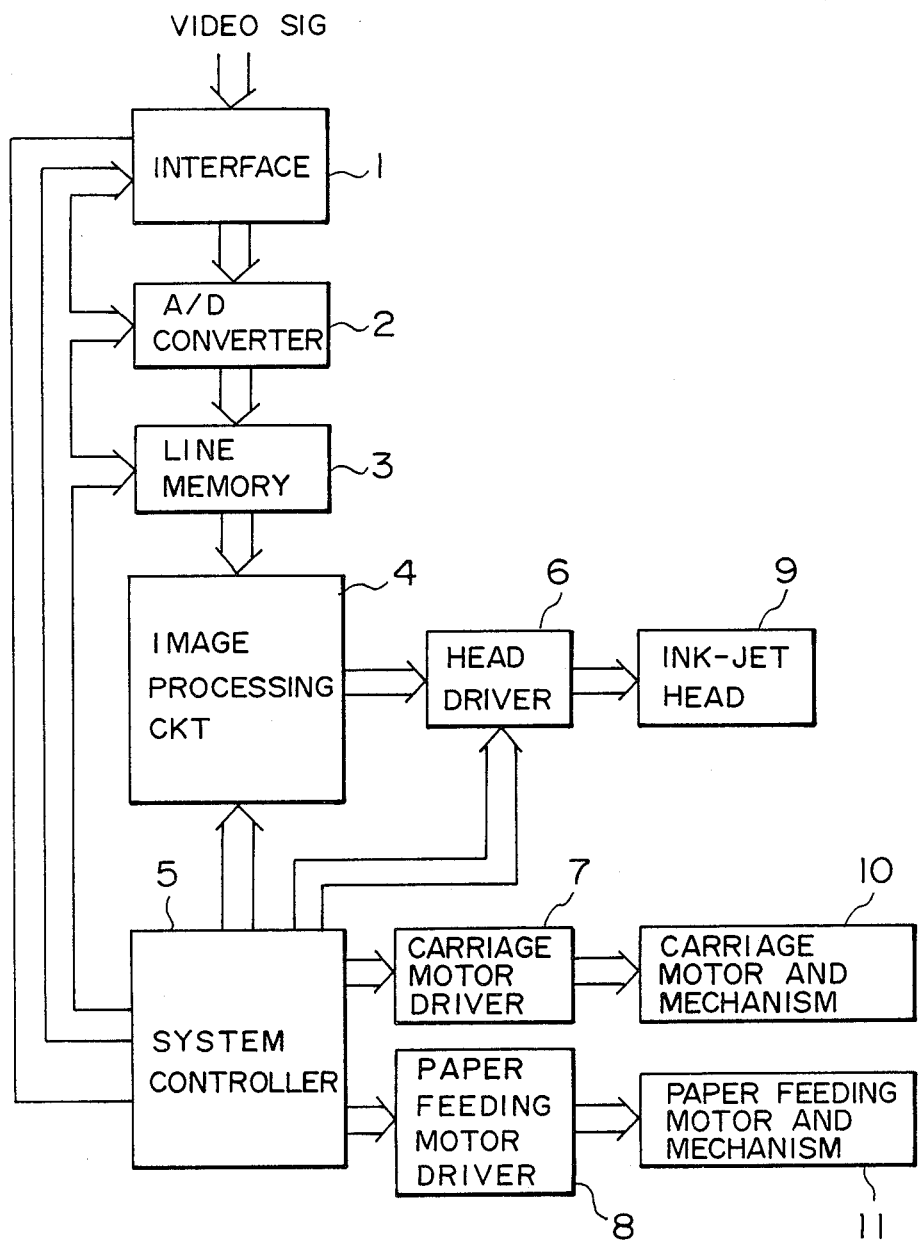
FIG. 1 is a block diagram of a control section of an ink-jet color printer.

FIG. 1 shows a control block diagram when the present invention is applied to an ink-jet color printer.

A video signal such as a composite video signal including R, B and G color signals and a sync signal is supplied to a video signal interface 1. The input signal is synchronized by the interface 1 and is then sampled and held by a sample/hold circuit. The obtained signal is supplied to an A/D converter 2 and the R, G and B color signals are converted into digital signals. The digital signals from the A/D converter 2 are stored in a line memory 3 in units of several lines. The line to be used herein may be a vertical line or a horizontal line. Data in the line memory 3 is supplied to an image processing circuit 4 which performs color conversion, $\gamma$-conversion, masking, undercolor removal, and the like in units of pixels. The digital signals are generally converted into cyan, magenta, yellow and black signals which are then converted into drive signals of corresponding magnitudes. The drive signals are applied to a head driver 6. An ink-jet head 9 injects ink in an amount corresponding to the magnitude of the applied voltage to expres hue and density. The ink-jet head used in this embodiment has two heads for printing dark and bright dots for each of the hues cyan, magenta and yellow, and has a single head for printing dots of single density for black. Although two heads are used for yellow, since perception sensitivity of the human eye to yellow is poor, a single head for yellow only can be used.

A system controller 5 for controlling the sequence of the printer generates a head drive signal, a carriage motor drive signal, and a paper feed signal at a timing corresponding to an input image signal. These signals are respectively supplied to the head driver 6, a carriage motor driver 7, and a paper feeding motor driver 8. The ink-jet head 9, a carriage motor and its mechanism 10, a paper feeding motor and its mechanism 11 are controlled at a proper timing so as to print a reproduced image of an input video signal onto a recording medium.

FIG. 2 is a detailed block diagram of the image processing circuit 4 shown in FIG. 1.

The R, G and B signals are converted by a CMY converter 21 into cyan, magenta and yellow density signals $C_0$, $M_0$ and $Y_0$. For example, processing performed includes $C_0 = -\log_{10} R$, $M_0 = -\log_{10} G$, and $Y_{10} = -\log_{10} B$.

Gamma conversion of the signals is then performed by a γ-converter 22. The γ-converter performs, for example, the following processing:

$$C_1 = a_1(C_0)^{\gamma 1} + b_1$$

$$M_1 = a_2(M_0)^{\gamma 2} + b_2$$

$$Y_1 = a_3(Y_0)^{\gamma 3} + b_3$$

An undercolor removal circuit (to be referred to as an UCR circuit hereinafter) 23 determines if black is to be used in image reproduction. When it is determined that black is to be used, the black component is subtracted from the respective signals $C_1$, $M_1$ and $Y_1$. For example, a calculation $BK_2 = \alpha\{Min\ (C_1, M_1, Y_l)\} + \beta$ is performed. If $BK_2$ has a value larger than a predetermined value $L_B$, black is used to calculate:

$$C_2 = C_1 - BK_2$$

$$M_2 = M_1 - BK_2$$

$$Y_2 = Y_1 - BK_2$$

When $BK_2$ is smaller than the value $L_B$, the following relationships are used:

$$C_2 = C_1$$

$$M_2 = M_1$$

$$Y_2 = Y_1$$

A masking circuit 24 performs masking in consideration of excessive absorption of ink so as to provide respective density signals $C_3$, $Y_3$, $M_3$ and $BK_3$.

In general, the masking circuit 24 performs the following calculations to achieve this:

$$C_3 = f_C(C_2, M_2, Y_2, BK_2)$$

$$M_3 = f_M(C_2, M_2, Y_2, BK_2)$$

$$Y_3 = f_Y(C_2, M_2, Y_2, BK_2)$$

$$BK_3 = f_{BK}(C_2, M_2, Y_2, BK_2)$$

As for the functions $f_C$, $f_M$, $f_Y$ and $f_{BK}$, the following matrix can be used:

$$\begin{pmatrix} C_3 \\ M_3 \\ Y_2 \\ BK_3 \end{pmatrix} = \begin{pmatrix} M_{11} & M_{12} & M_{13} & M_{14} \\ M_{21} & M_{22} & M_{23} & M_{24} \\ M_{31} & M_{32} & M_{33} & M_{34} \\ M_{41} & M_{42} & M_{43} & M_{44} \end{pmatrix} \begin{pmatrix} C_2 \\ M_2 \\ Y_2 \\ BK_2 \end{pmatrix}$$

A matrix coefficient $M_{ij}$ can be determined by processing data obtained by actual color reproduction by the least squares method.

An output from the masking circuit 24 is supplied to an output switching multiplexer 26. When the analog method has been selected by a selection switch 25, the multiplexer 26 supplies the input data $C_3$, $M_3$, $Y_3$ and $BK_3$ to a density-voltage converter 29 and supplies the input data $C_3$, $M_3$, and $Y_3$ to a head selection controller 28. However, if the dither method has bee selected by the switch 25, the multiplexer 26 supplies the data $C_3$, $M_3$, $Y_3$ and $BK_3$ to a dither processor 30.

A description will first be made for processing by the analog method. The head selection control circuit 28 determines which densities of inks must be used in accordance with the density data $C_3$, $M_3$, and $Y_3$ and supplies head selection signals CC, MC, and YC for designating dark/bright ink heads.

In response to the density signals $C_3$, $M_3$, $Y_3$ and $BK_3$ and the selection signals CC, MC and YC, the density-voltage converter 29 applies voltages Cu, Mu, Yu, Ck, Mk, Yk, and Bk to the respective heads. The voltages Cu, Mu and Yu for bright ink heads are supplied to the head driver 6 through a switch circuit 35. At this time, the switch circuit 35 is closed by a selection signal from the selection switch 25.

The voltages Ck, Mk, Yk and Bk for the dark and black ink heads are supplied to the head driver 6 through an input switching multiplexer 36. At this time, the multiplexer 36 selects an output from the converter 29 in accordance with the selection signal from the switch 25.

The head selection controller 28 determines a value L for each color. When the data is larger than the value L, the controller 28 produces a signal designating a dark ink head. However, when the data is smaller than the value L, the controller 28 produces a signal designating a bright ink head. Alternatively, two threshold values $L_1$ and $L_2$ ($L_1 < L_2$) can be used. In this case, when the data is smaller than the value $L_1$, a bright ink head is selected. When the data is larger than the value $L_2$, a dark ink head is selected.

When the data falls between the values $L_1$ and $L_2$, a switch between the dark and bright ink heads is randomly made. When the latter method is adopted, the effect of preventing a pseudo edge line caused by density difference is enhanced.

A description will now be made on processing by the dither method.

When the dither method is selected by the switch 25, the multiplexer 26 supplies the data $C_3$, $M_3$, $Y_3$ and $BK_3$ to the dither processor 30. Using a threshold matrix such as a 4×4 matrix shown in FIG. 3, the dither processor 30 compares the input data $C_3$, $M_3$, $Y_3$ and $BK_3$ with the respective threshold value selected by X and Y address signals representing a printing position from the system controller 5. When each input is higher than the selected threshold value, the dither processor 30 produces control signals CS, MS, YS and BKS.

When the control signal CS for the cyan color is produced, a switch 31 is closed, and a preset voltage CP set by a preset circuit 27 is supplied to the mutiplexer 36. Preset voltages Mp, Yp, and BKp are also preset for other colors. In response to the corresponding control signals MS, YS and BKS, the preset voltages Mp, Yp and BKp are supplied to the multiplexer 36 through switches 32, 33 and 34, respectively. When the dither method is selected by the switch 25, the multiplexer 36 supplies the input signals Cp, Mp, Yp and BKp to the head driver 6. A switch 35 is opened, and the use of a bright ink head is prohibited.

In this manner, either the analog method or a density modulation method such as the dither method can be selected by means of the selection switch 25. Therefore, image processing suitable to each type of image can be performed. When the density modulation method is adopted, dots of a single density are used even if dots of a single color and a plurality of densities are available. Therefore, reproduction of an area of an original image in a single color of different hues and resultant formation of a pseudo edge line are prevented. In the case of graph reproduction such as an output from a computer, the original image can be reproduced in the same hue.

The above embodiment is described with reference to the case of an ink-jet printer. However, the present invention can be similarly applied to a thermal transfer printer, an electrostatic printer, a laser beam printer or the like provided each can form dots of a plurality of densities in a single color.

A means for producing a selection signal for selecting the processing method is manually operated in the above embodiment. However, the method adopted can be automatically determined by performing pattern recognition of an input image signal or detecting by a suitable method the frequency of occurrence of each density level in input data.

As described above, a color image formation apparatus according to the present invention has recording means for forming dots of a plurality of densities for at least one of a plurality of colors, first drive means for driving said recording means so as to modulate a dot size, second drive means for driving said recording means while keeping the dot size constant, and control means for controlling said recording means to use dots of a single density when selecting means selects said second drive means. Therefore, a color image suitable to an input image can be reproduced. In other words, not only pictorial images of persons or scenery but also artificial images such as graphs, figures, or computer graphic patterns can be reproduced without forming pseudo edge lines. In the case of pictorial images, when bright dots are used, bright colors such as skin colors can be reproduced with excellent quality and in the case of artificial images, dark dots are used to provide clear printed images.

The present invention is not limited to the above embodiment and various changes and modifications may be made within the spirit and scope of the claims appended hereto.

What is claimed is:

1. An image formation apparatus comprising:
   dot recording means for forming dots of a plurality of different colors in accordance with input image signals, wherein dots of at least one color may be formed by depositing recording materials of different concentrations;
   first drive means for driving said recording means so as to modulate dot size;
   second drive means for driving said recording means while keeping dot size constant; and
   selecting means for selecting said first drive means when the input image signals correspond to a pictorial image and said second drive means when the input image signals correspond to an artificial image, wherein dots in each of the colors are formed using a recording material of a single concentration when said selecting means selects said second drive means.

2. An apparatus according to claim 1, wherein when said second drive means is selected, recording materials of the highest concentration are used.

3. An apparatus according to claim 1, wherein said recording means comprises an ink-jet recording head.

4. An apparatus according to claiam 1, wherein said second drive means comprises a dither processing circuit.

5. A color image formation apparatus comprising:
   recording means for forming dots of a plurality of different colors, wherein dots of at least one color may be formed by depositing recording materials of different concentrations;
   first drive means for driving said recording means so as to change dot size;
   second drive means for driving said recording means while keeping dot size constant;
   selecting means for selecting one of said first and second drive means; and
   control means for controlling said recording means so as to form dots of each color only in the highest available recording material concentration when said selecting means selects said second drive means.

6. An apparatus according to claim 5, wherein said selecting means selects said first drive means when input image signals correspond to a pictorial image.

7. An apparatus according to claim 5, wherein said selecting means selects said second drive means when input image signals correspond to an artificial image.

8. An apparatus according to claim 5, wherein said recording means comprises an ink-jet recording head.

9. An apparatus according to claim 5, wherein said second drive means comprises a dither processing circuit.

10. An image formation apparatus comprising:
    recording means for forming dots of a plurality of different colors in response to input image signals, wherein dots of at least one color may be formed by depositing recording materials of a plurality of different concentrations;
    first drive control means for driving said recording means so as to be able to form dots of each color in a plurality of recording material concentrations;
    second drive control means for driving said recording means so a to form dots only in the highest available recording material concentration for each of the plurality of colors; and
    selecting means for selecting one of said first and second drive control means.

11. An apparatus according to claim 10, wherein said selecting means selects said first drive means when the input image signals correspond to a pictorial image.

12. An apparatus according to claim 10, wherein said selecting means selects said second drive means when the input image signals correspond to an artificial image.

13. An apparatus according to claim 10, wherein said recording means comprises an ink-jet recording head.

14. An apparatus according to claim 10 wherein said second drive control means comprises a dither processing circuit.

* * * * *

UNITED STATES PATENT AND TRADEMARK OFFICE
CERTIFICATE OF CORRECTION

PATENT NO. : 4,772,911
DATED : September 20, 1988
INVENTOR(S) : TAKASHI SASAKI, ET AL.

It is certified that error appears in the above-identified patent and that said Letters Patent is hereby corrected as shown below:

AT [56] IN THE REFERENCES CITED

U.S. Patent Documents, "Steeme" should read --Stemme--.

COLUMN 2

Line 51, "expres" should read --express--.
Line 57, "only" should be deleted.

COLUMN 3

Lines 56-61, "$\begin{Bmatrix} C_3 \\ M_3 \\ Y_2 \\ BK_3 \end{Bmatrix}$" should read --$\begin{Bmatrix} C_3 \\ M_3 \\ Y_3 \\ BK_3 \end{Bmatrix}$--.

COLUMN 4

Line 5, "bee" should read --been--.
Line 58, "mutiplexer 36." should read --multiplexer 36.--.

UNITED STATES PATENT AND TRADEMARK OFFICE
CERTIFICATE OF CORRECTION

PATENT NO. : 4,772,911

DATED : September 20, 1988

INVENTOR(S) : TAKASHI SASAKI, ET AL.

It is certified that error appears in the above-identified patent and that said Letters Patent is hereby corrected as shown below:

COLUMN 6

Line 8, "claiam 1," should read --claim 1,--.
Line 48, "a" should read --as--.
Line 54, "first drive means" should read --first drive control means--.
Line 57, "second drive means" should read --second drive control means--.
Line 62, "claim 10" should read --claim 10,--.

Signed and Sealed this

Eleventh Day of April, 1989

Attest:

DONALD J. QUIGG

Attesting Officer

Commissioner of Patents and Trademarks